(12) United States Patent
Kuzmin et al.

(10) Patent No.: US 11,173,428 B2
(45) Date of Patent: Nov. 16, 2021

(54) FILTER CARTRIDGE OF WATER PURIFICATION SYSTEM

(71) Applicant: ELECTROPHOR, INC., Woodmere, NY (US)

(72) Inventors: Aleksey Leonidovich Kuzmin, Saint-Petersburg (RU); Gleb Dmitrievich Rusinov, Saint-Petersburg (RU); Joseph Lvovich Shmidt, Woodmere, NY (US)

(73) Assignee: ELECTROPHOR, INC., Woodmere, NY (US)

( * ) Notice: Subject to any disclaimer, the term of this patent is extended or adjusted under 35 U.S.C. 154(b) by 0 days.

(21) Appl. No.: 16/097,860

(22) PCT Filed: May 22, 2017

(86) PCT No.: PCT/RU2017/000333
§ 371 (c)(1),
(2) Date: Oct. 31, 2018

(87) PCT Pub. No.: WO2017/200423
PCT Pub. Date: Nov. 23, 2017

(65) Prior Publication Data
US 2019/0134538 A1 May 9, 2019

(30) Foreign Application Priority Data

May 20, 2016 (RU) .......................... RU2016119689

(51) Int. Cl.
*C02F 1/28* (2006.01)
*C02F 1/42* (2006.01)
(Continued)

(52) U.S. Cl.
CPC ............. *B01D 24/12* (2013.01); *B01D 24/10* (2013.01); *B01D 36/001* (2013.01); *C02F 1/001* (2013.01);
(Continued)

(58) Field of Classification Search
CPC .. C02F 1/003; C02F 1/283; C02F 1/42; C02F 2201/006; C02F 2307/04; C02F 1/001;
(Continued)

(56) References Cited

U.S. PATENT DOCUMENTS 4,306,971 A 12/1981 Hankammer
5,049,272 A 9/1991 Nieweg
(Continued)

FOREIGN PATENT DOCUMENTS

RU 2136347 C1 * 9/1999
RU 2262976 C1 * 10/2005 ............. C02F 1/003

*Primary Examiner* — Matthew O Savage
(74) *Attorney, Agent, or Firm* — Anna Vishev

(57) ABSTRACT

A filtration cartridge of a liquid purification device that consists of a filtration zone (1) and a venting zone (6), said filtration zone in turn consists of a housing (2) filled with a filtration material (3) and not less than one opening (5) made in the bottom (4) of the housing (2), said venting zone consists of fixation means (7) and a lid (8), performed so that the filtration material (3) has a multi-clustered interconnected structure, and the venting zone (6) is formed so as to retain and preserve the main structure of the filtration material (3) inside the housing (2) of the filtration cartridge, by means of the fixation means (7) being the first retention barrier and made as a grid, the size of mesh (11) of said grid does preferably not exceed the average size of the filtration material cluster, and the lid (8) is made as a second retention barrier and formed, with meshes (12) comprising net sec-
(Continued)

Figure 1:
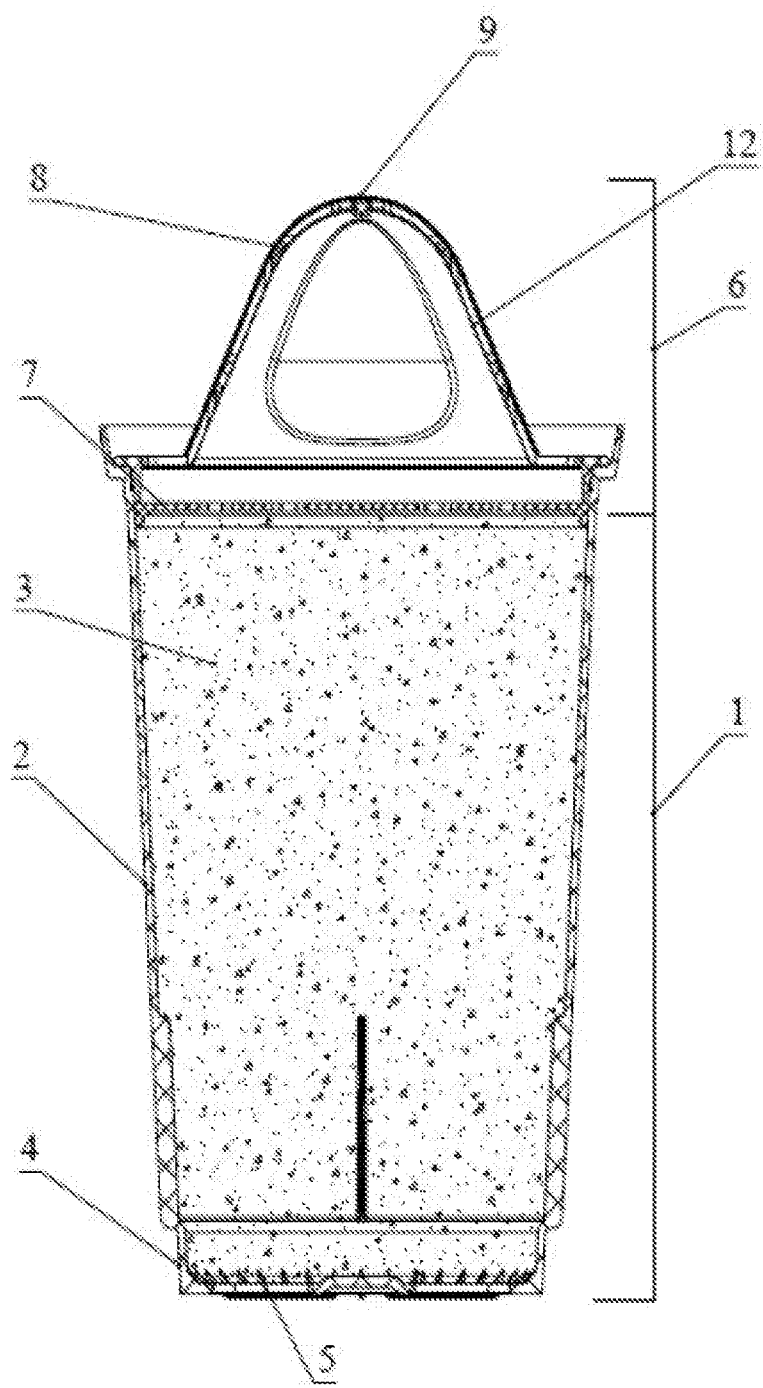

tions and a top point (9) of the lid (8) is positioned at a distance preferably not more than 1 cm above the fixation means (7).

9 Claims, 3 Drawing Sheets

(51) Int. Cl.
*B01D 24/12* (2006.01)
*B01D 24/10* (2006.01)
*C02F 1/00* (2006.01)
*B01D 36/00* (2006.01)

(52) U.S. Cl.
CPC .............. *C02F 1/003* (2013.01); *C02F 1/283* (2013.01); *C02F 1/42* (2013.01); *C02F 2201/006* (2013.01); *C02F 2307/04* (2013.01)

(58) Field of Classification Search
CPC .......... C02F 1/20; C02F 2103/02; C02F 1/18; B01D 27/02; B01D 36/001; B01D 24/12; B01D 24/10

USPC .................................................. 210/263, 472
See application file for complete search history.

(56) References Cited

U.S. PATENT DOCUMENTS

| | | | |
|---|---|---|---|
| 5,188,727 A | 2/1993 | Kurth | |
| 6,841,067 B1 * | 1/2005 | Hofmann | ................ C02F 1/003 210/266 |
| 2006/0163151 A1 * | 7/2006 | Kawasaki | ............ B01J 20/2803 210/502.1 |
| 2007/0187315 A1 * | 8/2007 | Vinogradova | .......... C02F 1/003 210/232 |
| 2012/0305467 A1 * | 12/2012 | Giebelhausen | ...... B01J 20/2803 210/263 |
| 2012/0305474 A1 * | 12/2012 | Shmidt | ................. B01J 47/018 210/502.1 |
| 2013/0193060 A1 | 8/2013 | Takeda | |

\* cited by examiner

FILTER CARTRIDGE OF WATER PURIFICATION SYSTEM

FIELD OF THE INVENTION

The invention relates to water purification devices of gravity type, intended for final purification of tap water and other liquids for household purposes.

STATE OF THE ART

From the state of the art water purification devices of gravity type usually consist of three elements: container for the raw liquid and container for purified liquid, which communicate with each other through water filtration cartridge. Raw liquid is poured into container for raw liquid and under gravity forces it flows through filtration cartridge and collects in the container for purified liquid. As it is known filtration cartridge consists of filtration zone and venting zone. Venting zone is executed as the lid with openings for raw liquid inflow and air outflow. Filtration zone has in its bottom not less than one opening for purified water outflow and as usual is filled with filtration material. For example granulated and fibrous sorbents can be used as filtration materials in such purification devices.

Filtration cartridge of water purification device according to a U.S. Pat. No. 4,306,971 (B01 23/10, опубл 22.12.1981, Chemie Brita Gerate Ing.) is known from the state of the art. The given cartridge comprises filtration zone and venting zone. Filtration zone consists of a housing filled with filtration material and has in its bottom not less than one opening for purified water outflow. Venting zone consists of fixation means and a lid. Fixation means and a lid make up a whole. The lid is executed as the high tube in the upper wall. In the tube the venting opening is made. The fixation means is a perforated disk with longitudinal apertures. The size of these apertures is less then the size of particles of filtration material. The lid with vent opening for air outflow is placed on the central vertical axis of the filtration cartridge. Filtration material is granulated sorbent.

Filtration cartridge according to U.S. Pat. No. 4,306,971 operates in the following manner. The raw liquid flows through longitudinal openings of the fixation means, passes filtration material and purified liquid flows out of the cartridge through the opening made in the bottom of the cartridge. When liquid is flowing through filtration material, the air dissolved in the liquid, collects near the surface of the fixation means, forming air bubble, leading to local plugging of the apertures for liquid inlet. The air gradually goes out filtration zone and through venting zone leaves the cartridge, flowing out of the opening, made in the upper wall of the lid.

The drawback of the cartridge described in a patent U.S. Pat. No. 4,306,971 is the following. Filtration material is granulated sorbent, the particles of which do not have physico-chemical bonding between each other, so it can't prevent splitting of its particles between each other and this leads to ducting effect, which negatively influences the filtration process. Also the filtration cartridge is constructed so that air can't leave the cartridge freely because the air bubble forming between surface of the filtration material and fixation means is to be of necessary size, so the pressure inside it is enough for air to pass through the lid executed as vertical tube.

Filtration cartridge of water purification device according to a U.S. Pat. No. 5,049,272 (B01D 24/14, published 17 Sep. 1991, Oxyphen AG) is known from the state of the art. Filtration cartridge consists of filtration zone and venting zone. Filtration zone in its turn consists of housing filled with filtration material and having in its bottom not less then one opening. Venting zone consists of a lid and fixation means.

Fixation means is made as a sieve of conical shape tapering to the top. Aperture for air outflow is made in the upper part of the cone. The size of openings of the sieve is smaller then the diameter of the filtration material particles. The lid has a cone shape too and is made with horizontal longitudinal apertures for water inlet. Air outflow means executed as a dome is made in the upper part of the lid. On the sidewall of the dome there is a at least one vertical aperture for air outflow, tapering upwardly. The width of the aperture is smaller than the diameter of the filtration material particles.

Filtration cartridge of the liquid purification device described in a patent U.S. Pat. No. 5,049,272 operates in the following manner. The raw liquid through the apertures made in the lid, flows through fixation means to the housing of the filtration zone into the filtration material. After this purified liquid flows out of the apertures in the cartridge bottom.

As in the previous patent family member, the drawback of the construction of the cartridge according to the U.S. Pat. No. 5,049,272 is that filtration material is a granulated sorbent, the particles of which do not have physico-chemical bonding between each other, so it can't prevent splitting of its particles between each other and this leads to ducting effect, which negatively influences the filtration process. Also during filtration process the liquid flows through the apertures of the fixation means, which have small size, the air dissolved in the water collects in the upper layer of the filtration material and in the space above it and collides with the water flow. Because of the small diameter of the seive openings, the air cannot enter venting zone freely. It gradually goes out of the aperture, made in the fixation means, and aggravates the liquid flow inside the filtration cartridge. This decreases filtration speed and increase filtration time.

Also filtration cartridge of water purification device according to a patent application US 2013/0193060 (BOID 27/08, опубл 1 Aug. 2013, Mitsubishi Rayon Cleansui Company) is known from the state of the art. The filtration cartridge consists of filtration zone and venting zone. Filtration zone consists of housing filled with filtration material, and has in its bottom not less than one opening for the purified liquid outlet. Venting zone is the space between upper surface of the filtration material and the lid. The filtration zone and venting zone do not have distinct separation, for example by fixation means. Filtration material consists of granulated sorbent and hollow fiber module. The lid has a cone shape. Side walls of the lid are made as a mesh. The size of the mesh openings is much less than the size of the particles of the granulated sorbent. The opening for the air outlet is made on the upper wall of the lid.

Filtration cartridge of the water purification device of the patent application US 2013/0193060 operates in the following manner. Raw water through the side walls of the lid, which are made as net, enters the filtration zone, purifies, flowing through the granulated sorbent and hollow fiber module. Purified liquid flows out of the opening in the bottom of the filtration cartridge. Air dissolved in the liquid goes from the venting zone into the atmosphere through the openings of the side wall of the lid, and through the opening made in the upper part of the lid.

The drawback of the filtration cartridge of the water purification device of the patent application US 2013/0193060 is the following. The construction of the cartridge has no means to fixate the granulated sorbent in the filtration zone housing. This leads to uneven distribution of the sorbent in the housing of the filtration zone and air accumulation in the free space between filtration material of the filtration zone and the lid. The air from the filtration zone freely goes to the venting zone, but there the air flow confronts the liquid flow. These makes it difficult for liquid to pass through small openings of the mesh in the lid into filtration zone.

Also filtration cartridge of water purification device according to a patent RU 2262976 (B01 D 24/10, C02 F1/18, published. 27.10.2005, LLC «Aquaphor») is known from the state of the art. This filtration cartridge according to the patent RU 2262976 was chosen by the applicant as closest analogue.

Filtration cartridge consists of filtration zone and venting zone. Filtration zone consists of housing filled with filtration material which is the mixture of granulated and/or fibrous sorbents, and having in the bottom of the housing not less than one opening. Venting zone consists of fixation means and the lid. Fixation means is made as a sieve the openings in which have the size much less than the size of filtration material particles. In the center of the fixation means the valve of prescribed shape, width and length is made. The lid consists of the bottom and upper part provided with the openings for liquid inflow and air outflow.

Filtration cartridge of the liquid purification device of a patent RU 2262976 acts as follows. Raw water through the openings made in the lid and in the fixation means flows into filtration material of the filtration zone, where it is purified. Purified liquid flows out of the opening made in the bottom of the filtrstion cartridge. At the same time the air, existing in the liquid rises up and goes into venting zone through the valve mentioned above.

The drawback of the filtration cartridge of a patent RU 2262976 is the following. During the liquid flows through the filtration material the undesired compression of the composition material can occur, which leads to filtration time increase, filtration speed decrease and structural damage of the composition material. Also the pressure inside the air bubble, forming during filtration process has to be sufficient to push the air from the filtration zone through the valve as the diameter of the openings in the fixation means is small for simultaneous liquid flowing into filtration material and air going out of the filtration zone.

The object of the invention and the technical result achieved with the use of the invention is to develop new filtration cartridge, to increase the filtration speed and decrease the filtration time.

Problem to solve and claimed technical result when using this invention is achieved by that filtration cartridge of liquid purification device consists of filtration zone and venting zone, filtration zone in its turn consists of housing filled with the filtration material and not less than one opening made in the bottom of the housing, venting zone consists of fixation means and the lid, characterized in that filtration material has multi clustered interconnected structure, and venting zone is performed so as to retain and keep the main structure of the filtration material inside the housing of the filtration cartridge, by means of that fixation means is the first retention barrier and is made as a grid, the size of openings of grid preferably is not more than average size of the filtration material cluster, and the lid is made as the second retention barrier and is formed with openings having net elements and a top point of the lid is positioned at a distance preferably not more than 1 cm above the fixation means, and the size of each opening of every net element is smaller than the size of the openings of the fixation means by preferably at least one order of magnitude, the size of of each opening of every net element is preferably not less than 50 microns, but not more than 250 microns. Also the fixation means has flat or more complicated configuration for example, wavelike, cone-shaped or stepped configuration. And filtration material is the composite material, containing granulated material and fibrous component and filtration material structure is formed by clusters, containing interlaced fibers with granules of the sorbent distributed inside, the clusters are binded together by individual fibers throughout the volume of the filtration material, the average size of the cluster of the filtration material preferably is not less than 1.5 mm, but not more than 15 mm. The gas outlet means is made in the lid, performed as apertures in amount from 1 to 20 (but not more than 20) the size of which is from 0.5 to 1.5 mm and at least one aperture for gas outlet is located in the upper part of the lid and not less than one aperture of the gas outlet means is located in the upper part of the lid.

The FIG. 1 depicts vertical cross-section of the filtration cartridge of the water purification device.

Figure 2:
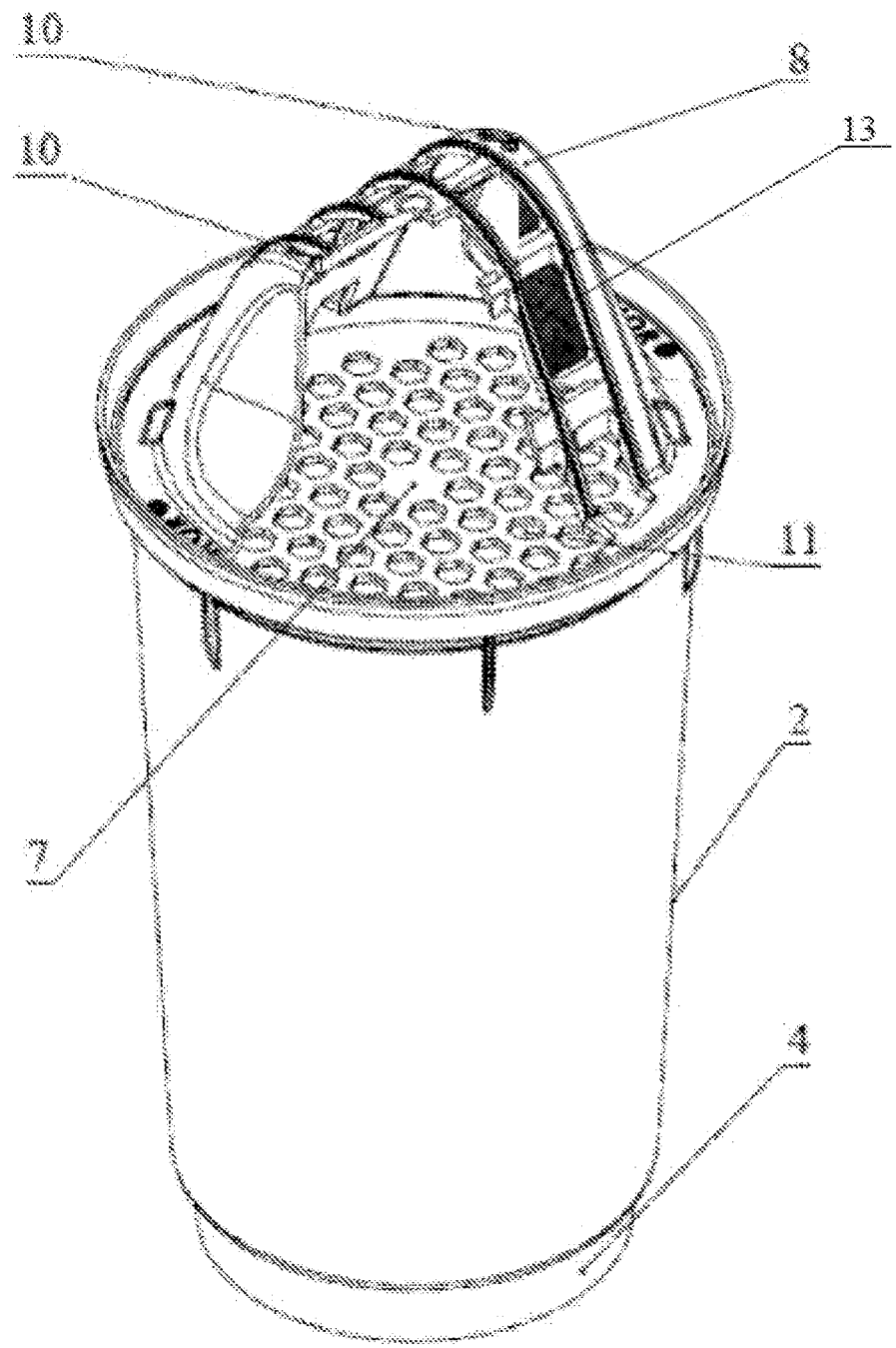
Figure 3:
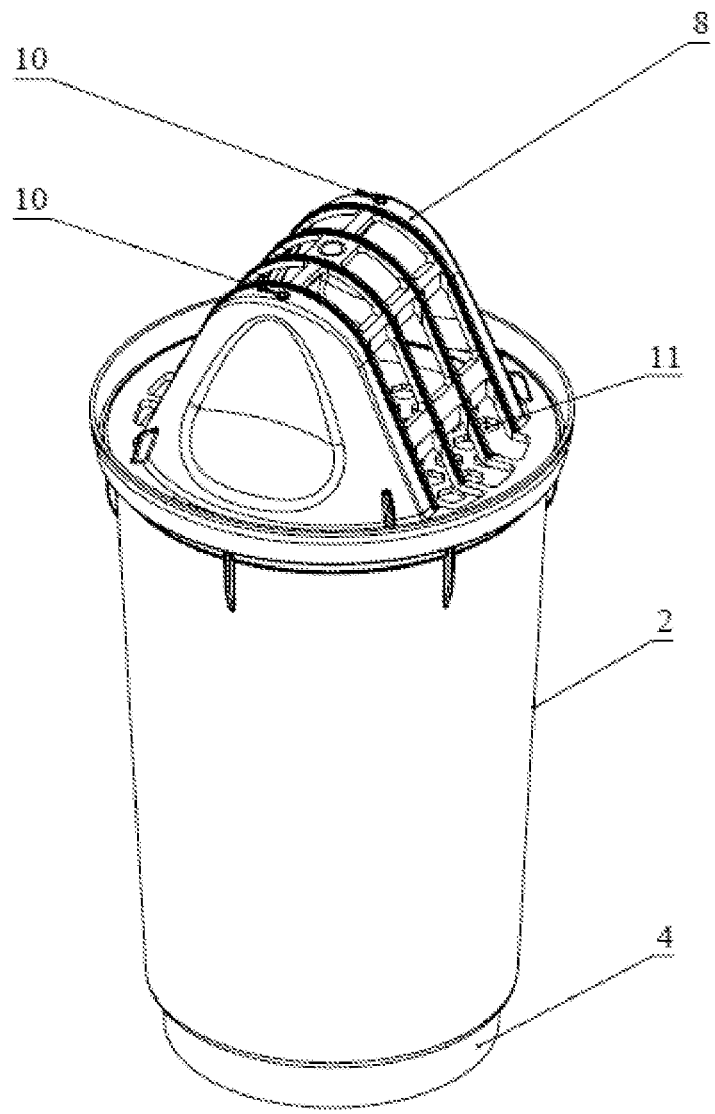

The FIGS. 2 and 3 depict the venting zone in details.

Filtration cartridge of the water purification device (FIGS. 1-3) comprises filtration zone 1 and venting zone 6. Filtration zone 1 consists of a housing 2 filled with the filtration material 3 and having not less than one opening 5 in its bottom 4. Venting zone 6 consists of fixation means 7 and a lid 8.

Filtration material 3 (FIG. 1) has multi clustered structure formed by granulated and fibrous sorbents. Every cluster is interlaced fibers with sorbent granules distributed between them. Inside the clusters fibers retain sorbent granules, preventing their moving and compression, occurring because of dipole-dipole (van der Waals) forces. The multi cluster structure is formed because individual fibers interlace around mentioned clusters throughout the volume of the of the filtration material. The average cluster size of the filtration material is from 1.5 to 15 mm.

Highly-efficient finely dispersed adsorbents, for example, powdered activated carbon and/or ion exchange resins of different dispersion can be used as granulated sorbents, and ion exchange fibers and activated carbon fibers, fibers on the basis of polyacrylonitrile can be used as fibrous sorbent.

Fixation means 7 is the first retaining barrier and is made as a grid. The indicated grid may have flat (FIGS. 1-3) configuration or, for example, wavelike, cone-shaped or stepped configuration (not depicted in the figures). If the grid has wavelike, cone-shaped or stepped configuration the fixation of the filtration material inside the housing 2 will be stronger. The size of the meshes 11 (FIGS. 2, 3) of the grid 7 is not more than the average size of the filtration material cluster. Besides retaining and fixation of the filtration material fixation means 7 prevents an air bubble formation between the filtration material surface and venting zone 6. This happens because the size of the openings of the fixation means 7 is big enough, so there is no collision between liquid flow and air flow. Besides this, because of interconnected clustered structure of the filtration material 3 there is no clogging of mesh of the fixation means 7 with granulated sorbent particles of filtration material 3.

The lid 8 (FIG. 1-3) is provided with openings 12 (FIG. 1) and the top point 9 of the lid 8 is preferably 1 cm higher than fixation means 7 (FIG. 1-3). In the openings 12 net elements 13 are made (FIG. 2). The size of the each opening of every net element is much less than the size of the openings 11 (FIGS. 2, 3) of the fixation means 7 (FIGS. 1-3) and is from 50 to 250 microns. The lid (8) is the second retention barrier 8. The net prevents penetration of the minor particles of the granulated component of the filtration material 3 out of the venting zone 6 in case they fell in there (for example after mechanical impact during transportation).

The lid 8 net elements may be made of polymeric textile or non-woven material or may be produced together with the lid 8 by direct casting.

The air venting means 10 (FIGS. 2, 3) can be made in the upper part of the of the lid 8. This venting means 10 is one or group of the openings in amount not more than 20. The size of the opening preferably is from 0.5 to 1.5 mm.

Because there are few openings and they are of small size the particles of granulated component of the filtration material 3 can't leave the venting zone 6 even in case of direct water flow on these particles.

Filtration cartridge of the water purification device acts as follows. The raw water flows through mesh of the net of the lid 8, further through the venting zone 6 and the mesh 11 of the fixation means 7, passes into filtration material 3 in the housing 2 of the filtration zone 1, where the liquid is purified. Purified liquid flows out of at least one opening 5, made in the bottom of the housing 4. At the same time air leaves the filtration zone 1 through mesh of the fixation means 7 without air bubble formation. Then the air flows out through the mesh of the net of the lid 8 and/or through the air venting means (9).

Compared to filtration cartridges, described in the state of the art in the given cartridge filtration material has a multi clustered structure, which retains during filtration cartridge service life. The indicated structure decreases the possibility of channel effects occurrence, prevents the compacting of the filtration material during filtration and clogging the part of the usable volume of the filtration material with air. Besides here is no air bubble formation step. The absence of the air bubble formation step is determined by fixation means construction, which is the first retention barrier, and its mesh let the air go out of the filtration zone freely, construction of the lid, which is the second retention barrier, and multi clustered structure of the filtration material. So, as stated above, the given construction of the filtration cartridge allows to increase the filtration speed and decrease the filtration time.

In the description of the invention the preferable embodiment is given. The invention maybe changed, but within the limits of the present claims. This gives the possibility of its common use.

The invention claimed is:

1. A filtration cartridge of a liquid purification device that consists of a filtration zone (1) and a venting zone (6), said filtration zone in turn consists of a housing (2) filled with a filtration material (3) and not less than one opening (5) made in a bottom (4) of the housing (2), said venting zone consists of fixation means (7) and a lid (8), characterized in that the filtration material (3) has a multi-clustered interconnected structure formed of filtration media clusters, and the venting zone (6) is formed so as to retain and preserve a main structure of the filtration material (3) inside the housing (2) of the filtration cartridge, by means of the fixation means (7) being a first retention barrier and made as a grid, a size of openings (11) of said grid does not exceed an average size of the filtration material clusters, and the lid (8) is made as a second retention barrier and formed with openings (12) comprising net elements and a top point (9) of the lid (8) is positioned at a distance not more than 1 cm above the fixation means (7).

2. The filtration cartridge of a liquid purification device according to claim 1, characterized in that the size of each opening of every net element is smaller than the average size of the openings of the fixation means (7) by at least one order of magnitude.

3. The filtration cartridge of a liquid purification device according to claim 1, characterized in that the net elements are made of woven and nonwoven materials or are produced together with the lid by direct molding, the net elements having an opening size of not less than 50 microns, but not more than 250 microns.

4. The filtration cartridge of a liquid purification device according to claim 1, characterized in that the fixation means has a flat configuration.

5. The filtration cartridge of a liquid purification device according to claim 1, characterized in that each of the filtration material clusters is a composite material containing a granulated material and a fibrous component.

6. The filtration cartridge of a liquid purification device according to claim 5, characterized in that each of the filtration material clusters contains interlaced fibers with granules of a sorbent distributed inside, the clusters are bound together by individual fibers throughout the volume of the filtration material (3).

7. The filtration cartridge of a liquid purification device according to claim 1, characterized in that the average size of the clusters of the filtration material (3) is not less than 1.5 mm, but not more than 15 mm.

8. The filtration cartridge of a liquid purification device according to claim 1, characterized in that a gas outlet means is made in the lid (8), the gas outlet means being formed as apertures in an amount from 1 to 20, the apertures having a size which ranges from 0.5 to 1.5 mm, and at least one aperture of the gas outlet means is located in an upper part of the lid.

9. The filtration cartridge of liquid purification device according to claim 8, characterized in that not less than one aperture of the gas outlet means is located in the upper part of the lid.

* * * * *